United States Patent
Takahashi et al.

(10) Patent No.: US 6,798,157 B2
(45) Date of Patent: Sep. 28, 2004

(54) COMBINED MOTOR DRIVE AND CURRENT SENSING CIRCUIT

(75) Inventors: Toshio Takahashi, Rancho Palos Verdes, CA (US); Min Fang, Redondo Beach, CA (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 10/225,552

(22) Filed: Aug. 19, 2002

(65) Prior Publication Data

US 2003/0048086 A1 Mar. 13, 2003

Related U.S. Application Data

(60) Provisional application No. 60/313,012, filed on Aug. 20, 2001.

(51) Int. Cl.[7] .............................................. H02K 23/00
(52) U.S. Cl. ........................ 318/254; 318/138; 318/439; 318/139
(58) Field of Search .................................. 318/254, 138, 318/439, 135

(56) References Cited

U.S. PATENT DOCUMENTS

| | | | |
|---|---|---|---|
| 4,510,453 A | * | 4/1985 | Sun .............................. 329/312 |
| 5,661,381 A | * | 8/1997 | Blackburn ................... 318/254 |
| 5,689,162 A | | 11/1997 | Li |
| 5,719,519 A | | 2/1998 | Berringer |
| 5,900,714 A | | 5/1999 | Dubhashi et al. |
| 6,002,226 A | | 12/1999 | Collier-Hallman et al. |
| 6,215,435 B1 | | 4/2001 | Parry et al. |

* cited by examiner

Primary Examiner—Karen Masih
(74) Attorney, Agent, or Firm—Ostrolenk, Faber, Gerb & Soffen, LLP (57) ABSTRACT

A combined gate drive and current sensing circuit for a 3-phase AC PWM inverter system which uses gate signal information to reconstruct complete motor phase current for providing a linear motor phase current feedback signal.

16 Claims, 7 Drawing Sheets

COMBINED MOTOR DRIVE AND CURRENT SENSING CIRCUIT

CROSS-REFERENCE TO RELATED APPLICATIONS

This application claims priority to U.S. Provisional Application No. 60/313,012 filed Aug. 20, 2001 and entitled MOTOR CURRENT FEEDBACK GATE DRIVER.

BACKGROUND OF THE INVENTION

This invention relates to sensing of the current in a load circuit and, more particularly, to sensing the current in a motor control drive circuit.

A conventional motor control circuit receives AC input power and converts this AC power to DC power, which is then applied to a pulse width modulated (PWM) inverter. The inverter responds to gate drive signals to the transistors comprising the inverter to thereby develop the necessary motor drive signals.

Current sensing is an essential part of the motor drive system. Traditionally, current sensing has been implemented in the motor drive system as an independent function and circuit apart from the gate drive function.

More specifically, the current sensing function for motor drive application has traditionally been implemented using either a magnetic Hall Effect device or an optically isolated device with a shunt resistor. These traditional current sensing devices are physically independent components, and contain high voltage isolation or level shifting circuits inside of sensors in order to provide low level signal output. They are normally interfaced with an analog-to-digital converter for digitizing the analog signal into a digital control system, such as an DSP (Digital Signal Processor) or a microcontroller.

These prior art devices have the following limitations and cost disadvantage when used in a motor drive control system:

1) Integration limitation in an integrated circuit due to the requirement for discrete implementation of the magnetic component or optical isolation device;
2) The need to provide current sensing synchronization with PWM switching; and
3) The need to provide integration of overcurrent protection function.

SUMMARY OF THE INVENTION

An object of the invention is to sense motor current using a low side shunt resistor. One of the problems in doing so is that the waveform is incomplete and comprised of a plurality of saw tooth pulses. Accordingly, a further object of the invention to reconstruct a sinewave signal from such pulses.

In accordance with the present invention, this is done by providing a circuit which includes a sample and hold circuit for receiving the plurality of saw-tooth pulses and means for supplying a timing signal to the sample and hold circuit such that the plurality of saw-tooth pulses is converted to a sinusoidal signal at the output of the sample and hold circuit.

Another object of the invention is to synchronize current sensing with the gate drive signal applied to drive a power transistor.

In accordance with the present invention, this is accomplished by a circuit for driving a load and sensing load current, which includes at least one power transistor connected to the load, a gate drive unit for applying a gate drive signal to a gate of the transistor to turn the transistor on and off, and a current sensing device connected to the load for generating a signal proportional to current in the load, the signal being comprised of a plurality of pulses. A sample and hold circuit is provided for sampling and holding each of the pulses at predetermined times, the timing of the sample and hold circuit being controlled by the gate drive unit.

Preferably, the load is a three phase AC motor driven by a plurality of power transistors. Respective gate drive units, current sensing devices and sample and hold circuits are provided for each of the phases Other features and advantages of the present invention will become apparent from the following description of the invention which refers to the accompanying drawings.

DETAILED DESCRIPTION OF THE PREFERRED EMBODIMENT(S)

Figure 1A:
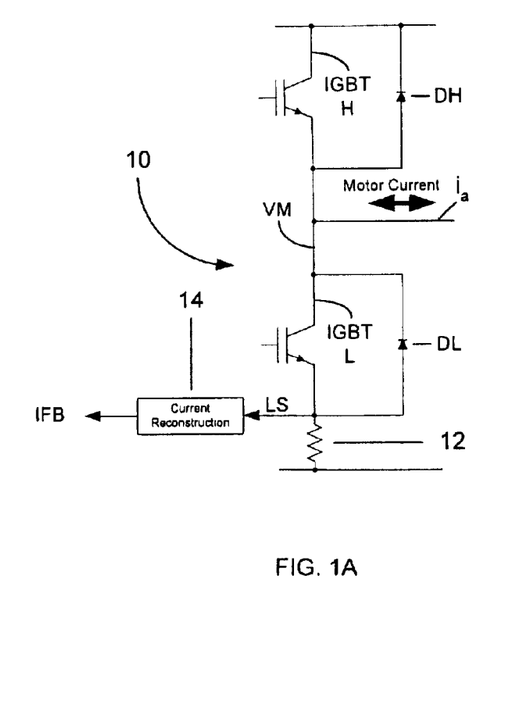
FIG. 1A shows a half-bridge PWM circuit driving one phase of an AC motor.
Figure 1B:
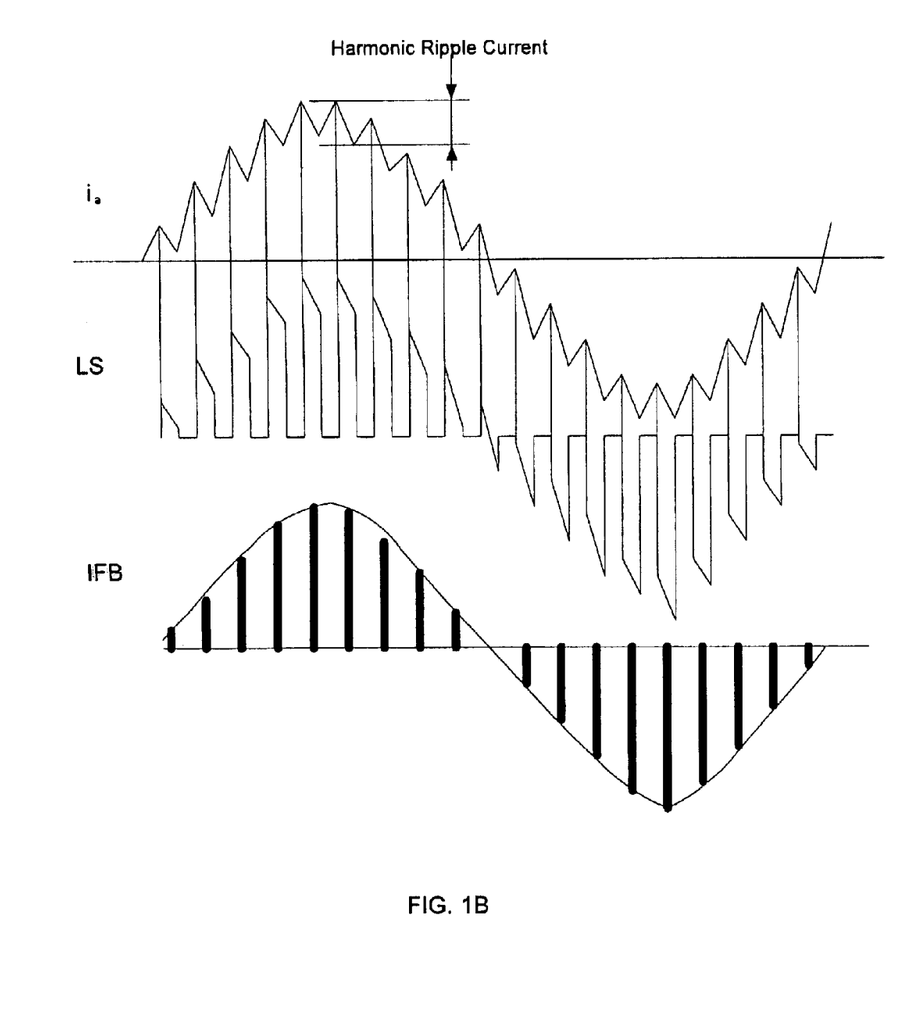
FIG. 1B shows typical current waveforms at three different locations of the half-bridge PWM circuit of FIG. 1B.

Referring now to the drawings and, in particular, to FIGS. 1A and 1B, FIG. 1A shows a half-bridge PWM (Pulse Wave Modulated) circuit 10 for driving one phase of an AC motor (not shown) and FIG. 1B shows typical current waveform at three different locations of the half-bridge PWM circuit 10. As is usual, sinusoidal current commutation is assumed.

The top waveform ia represents motor phase current which is normally sensed at the motor phase lead $i_a$. The second waveform, LS, is the voltage across the low side shunt resistor 12 due to current flow into the shunt resistor 12. The low side shunt resistor 12 is connected to the emitter of the low side IGBT (IGBT L) which has a low side fly wheel diode DL. The waveform LS is a saw-tooth waveform and incomplete as shown in FIG. 1B, i.e., the waveform is a plurality of pulses having saw-tooth forms. This is due to the fact that current does not flow through the low side shunt resistor 12 when it flows either through the high side IGBT (IGBT H) or the high side flywheel diode DH. It also contains harmonic ripple whose magnitude depends on the time constant (inductance and resistance) of the motor stator winding.

In a typical motor drive system, motor phase current is a popular and desired current waveform when used in a feedback control system, since control requires amplitude, frequency and phase angle information of the current waveform. However, any current sensing device sensing motor phase (shown as VM in FIG. 1A) requires an internal level shifter or isolation due to current sensing on the high voltage floating node because of the switching between the negative and positive DC bus voltage rails at a high dv/dt rate typically ranging between 2 kV/microsecond and 8 kV/microsecond. As a result, these devices tend to be more costly and complicated than devices using low side shunt based current sensing method.

Compared to high side sensing, the low side shunt based current sensing has a simple structure and is inherently noise immune since the saw-tooth current waveform is synchronized with the switching of the IGBT's. However, waveform reconstruction is required because the saw-tooth waveform pulses only contain partial waveform of the desired sinusoidal waveform.

In accordance with the present invention, a current reconstruction circuit 14 (FIG. 1A) captures the saw-tooth waveforms at a desired point and reconstructs a fundamental sinusoidal phase current waveform which is outputted as the current feedback signal IFB. The timing of the sample and hold circuit is obtained by gate drive signals.

Figure 2:
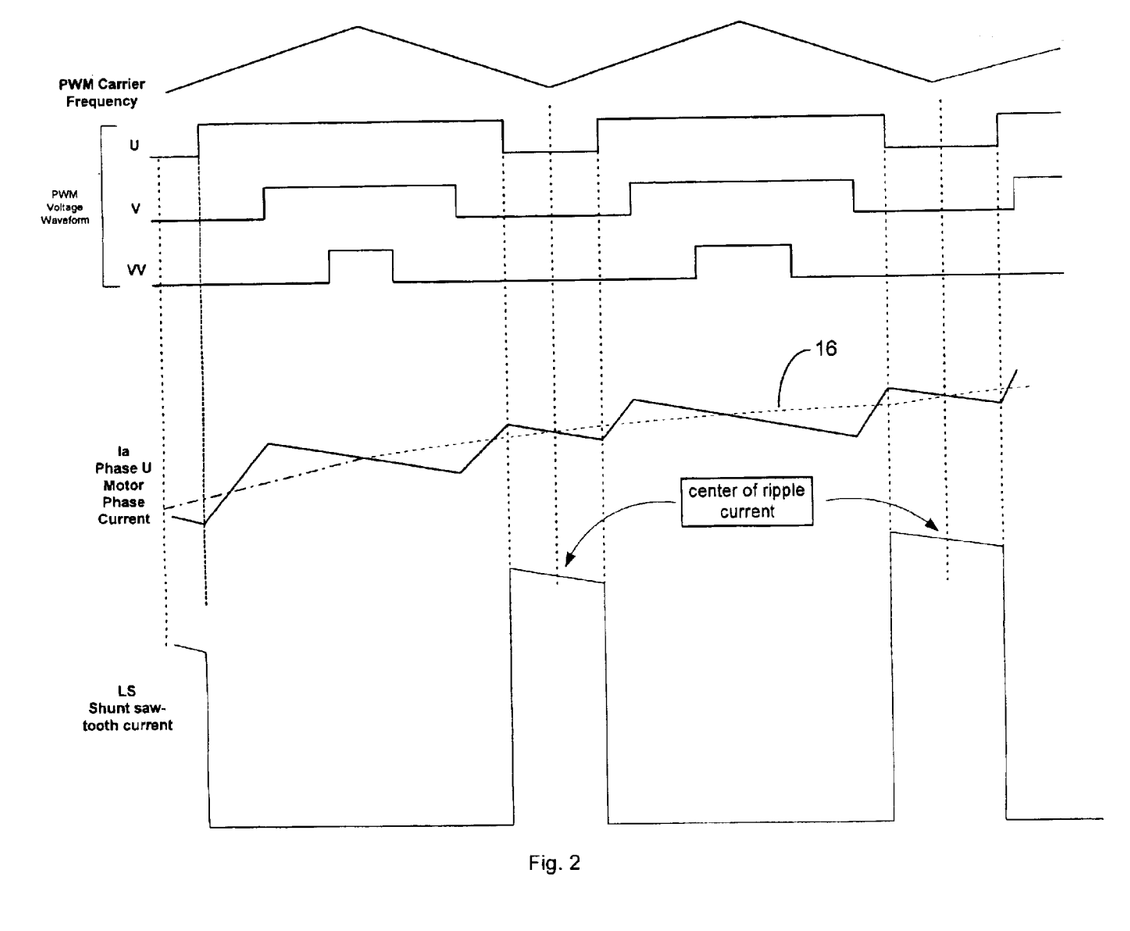
FIG. 2 shows the relation between the three phase gate signals and the current waveforms in the circuit of FIG. 1A.

FIG. 2 shows the relation between the three phase gate signal and current waveform. The top waveform is the PWM carrier frequency; the next waveforms are the PWM signals U, V and W for the three phases; the next waveform is the motor phase current for one of the phases, U, and the last waveform is the unreconstructed signal LS.

The example of FIG. 2 shows one particular phase current waveform, namely the phase U, although the principles are equally applicable to the other phases. When the gate signal U is low or off, a corresponding current waveform appears across the shunt resistor. At the same time when the gate signal U is low, the low side IGBT is on (IGBT L in FIG. 1A). Therefore, the voltage node, VM is essentially biased to one side of the shunt resistor creating a short circuit condition between the motor phase lead and the negative DC bus. Motor current, therefore, regardless of the current direction, will flow either through the low side IGBT or the low side flywheel diode DL. Under the condition that the signal ground is biased to the negative DC bus voltage potential, if the motor phase current flows from the motor (not shown) to VM (i.e., flowing in from the motor), then positive voltage is developed across the low side shunt resistor 12 resulting in positive saw-tooth current waveform (FIG. 2).

If the motor phase current flows from VM to a motor (i.e., flowing out to the motor), then a negative voltage is consequently developed.

Desirably, the reconstruction circuit 14 samples and holds the saw-tooth current waveform at the center of the off-period of the gate signal. This will essentially produce an average value of harmonic ripple current without filtering which is shown by the line 16 in FIG. 2.

Combining the gate drive function with a low side shunt resistor based current sensing function, enables motor phase current reconstruction and gate drive function to be implemented within the same circuitry.

Figure 3:
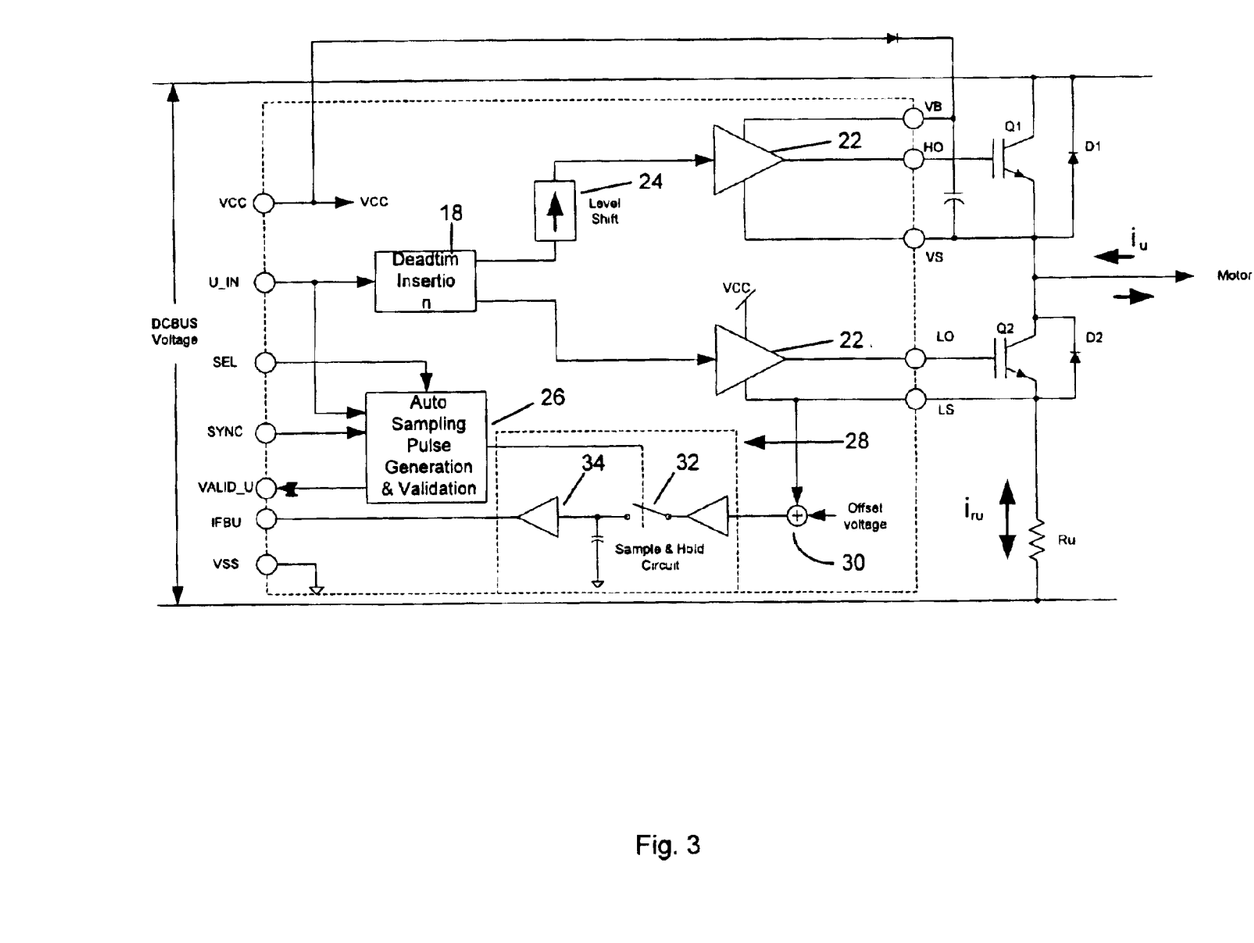
FIG. 3 shows a block diagram of a current sensing circuit for a single phase of a three phase system in accordance with certain features of the present invention.

FIG. 3 shows a basic block diagram of the current sensing circuit with gate drive function for one motor phase, the phase U. U_IN is a logic input for the phase U and it is inputted to a dead time insertion unit 18 which then provides signals to a high side predriver 20 and a low side predriver 22 with the signal provided to the high side predriver being provided through a level shifter 24. The output HO of the high side predriver 20 is applied to the gate of the high side IGBT $Q_1$ which has a fly wheel diode D1 thereacross and the output of the low side predriver 22 is applied to the gate of the low side IGBT $Q_2$ which has a fly wheel diode D2 thereacross. VB is the high side floating supply and VS is the high voltage floating supply return. LS is a low side return as well as representing the voltage developed across the shunt resistor $R_{ru}$ as a result of the current $i_{ru}$. VCC is a low side and logic fixed supply and VSS is the logic ground.

In addition to the foregoing components, which are conventional, in accordance with the invention, an auto-timing generation unit 26 and a current reconstruction circuit 28 are provided. The current reconstruction circuit 28, which advantageously comprises a sample and hold circuit 32, inputs voltage LS across the low side shunt resistor $R_{ru}$ followed by offset biasing in the offset biasing unit 30 to convert a bipolar signal to an unipolar signal. Then this signal is fed to the sample-and-hold circuit 32 followed by an output conditioning buffer 34, resulting in a final analog output which is a fully reconstructed sinusoidal phase current information. The timing of the sample/hold is generated from the internal gate signal.

Figure 4:
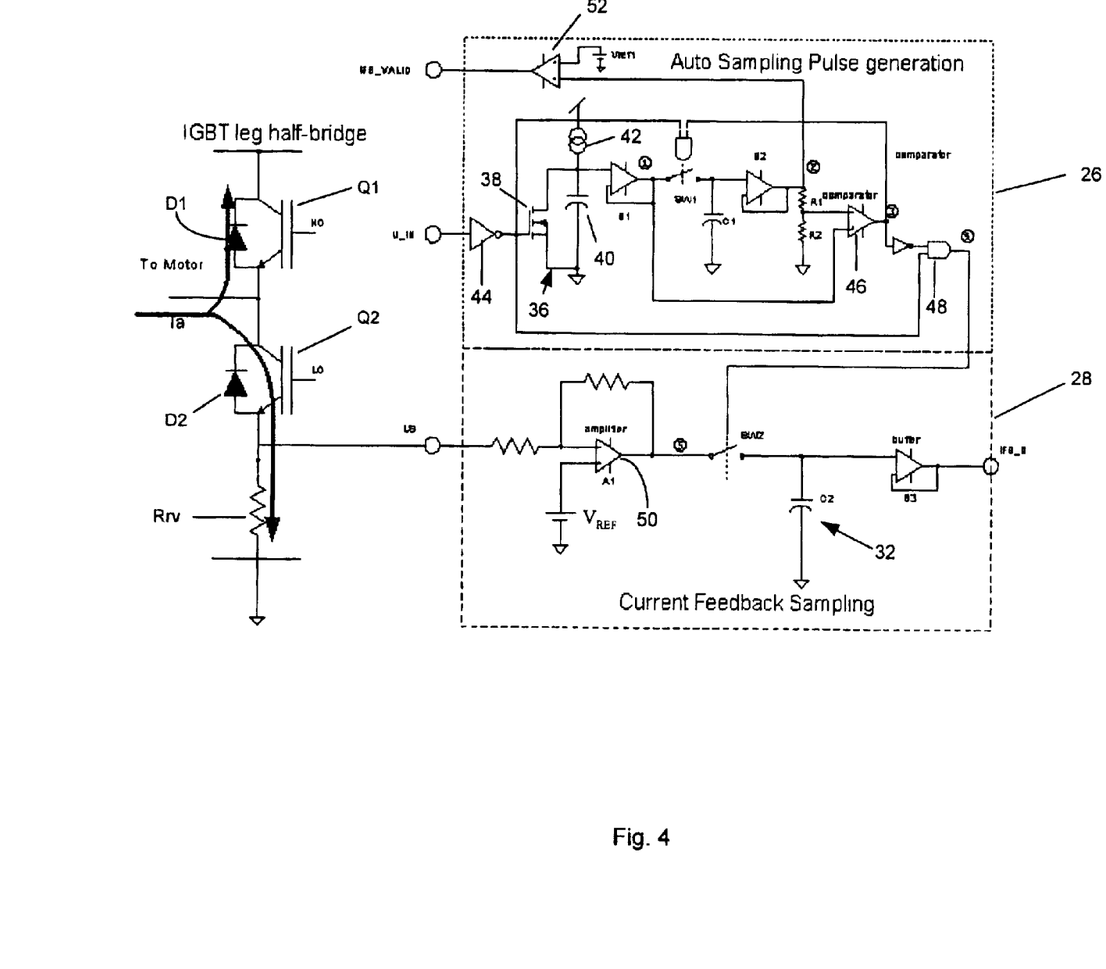
FIG. 4 shows further details of the circuit shown in FIG. 3.
Figure 5:
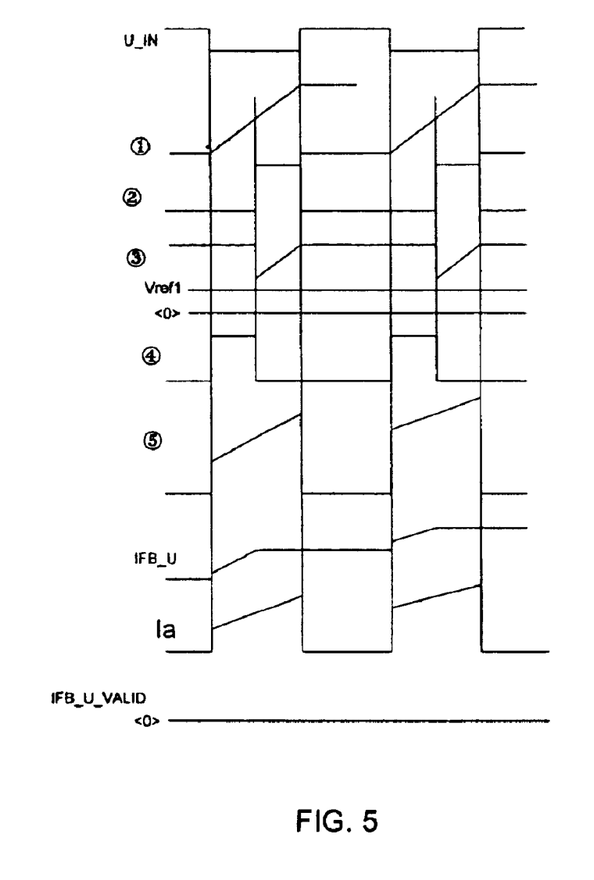
FIG. 5 shows timing wave forms at significant points of the circuit of FIG. 4.

FIG. 4 shows further details of the circuit shown in FIG. 3 and FIG. 5 shows timing waveform diagrams at each significant point of the circuit.

Referring now to FIG. 4, the auto sampling pulse generation circuit 28, basically uses the internal gate signal and generates an appropriate sample/hold signal which eliminates harmonic current ripple. It has a constant current source circuit 36 comprising a transistor 38, a capacitor 40, a constant current source 42 and a buffer B1 which is driven by the internal gate signal U_IN after inversion thereof. The output of the auto sampling pulse generation circuit 28 is a linear proportional ramp signal ① shown in FIG. 4 and FIG. 5. This signal after passing through a buffer B2 is then compared by a comparator 46 to a previously held signal ② in the capacitor C1 which is a half of the previous PWM off-time ramp signal. Initially, SW1 is assumed to be open. If the ramping signal ① is smaller than the previously held value ②, then SW1 remains open. As soon as the signal ① becomes greater than ②, SW1 is closed and the capacitor C1 starts to discharge to match up with the driving voltage of the buffer B1 and follows the ramping signal until the end of the PWM off-period (U_IN off period). There is also an AND logic gate 48 gating both the output of the comparator 46, i.e., the signal ③ and the inverted input gate signal, U_IN. This AND logic output goes high at the beginning of the U_IN off-period which coincides with start time of ramping.

When a match condition occurs between the signals ① and ②, at this instance of match condition, the AND logic output of AND gate 48 goes low. Then this signal ④ is used for the sample/hold circuit. While the signal ④ is high, SW2 within the sample and hold circuit 32 closes and consequently allows the hold capacitor C2 to track the input signal ⑤ which is the input signal LS after amplification by the amplifier 50. When the signal ④ transitions from high to low, SW2 opens and the sampled voltage is retained in C2. This transition essentially occurs at the center of PWM off-period (U_IN off-period). Therefore, harmonic ripple current effect is also minimized.

The auto sampling pulse generator 26 also contains an invalidation processing circuit 52 which indicates when the sample and hold circuit 32 cannot capture the current waveform. This limitation occurs when the gate signal U_IN has a very narrow pulse width. Practically, when the gate signal off-period pulse width becomes less than approximately one microsecond, then the sample and hold circuit cannot sample the current waveform. Vref1 is the voltage corresponding to the minimum pulse width compared against the half off-period value. If the gate signal off-period pulse width becomes smaller than Vref1, then IFB_VALID signal turns to a high state indicating the reconstructed signal is invalid to an interfacing digital microprocessor.

Figure 6:
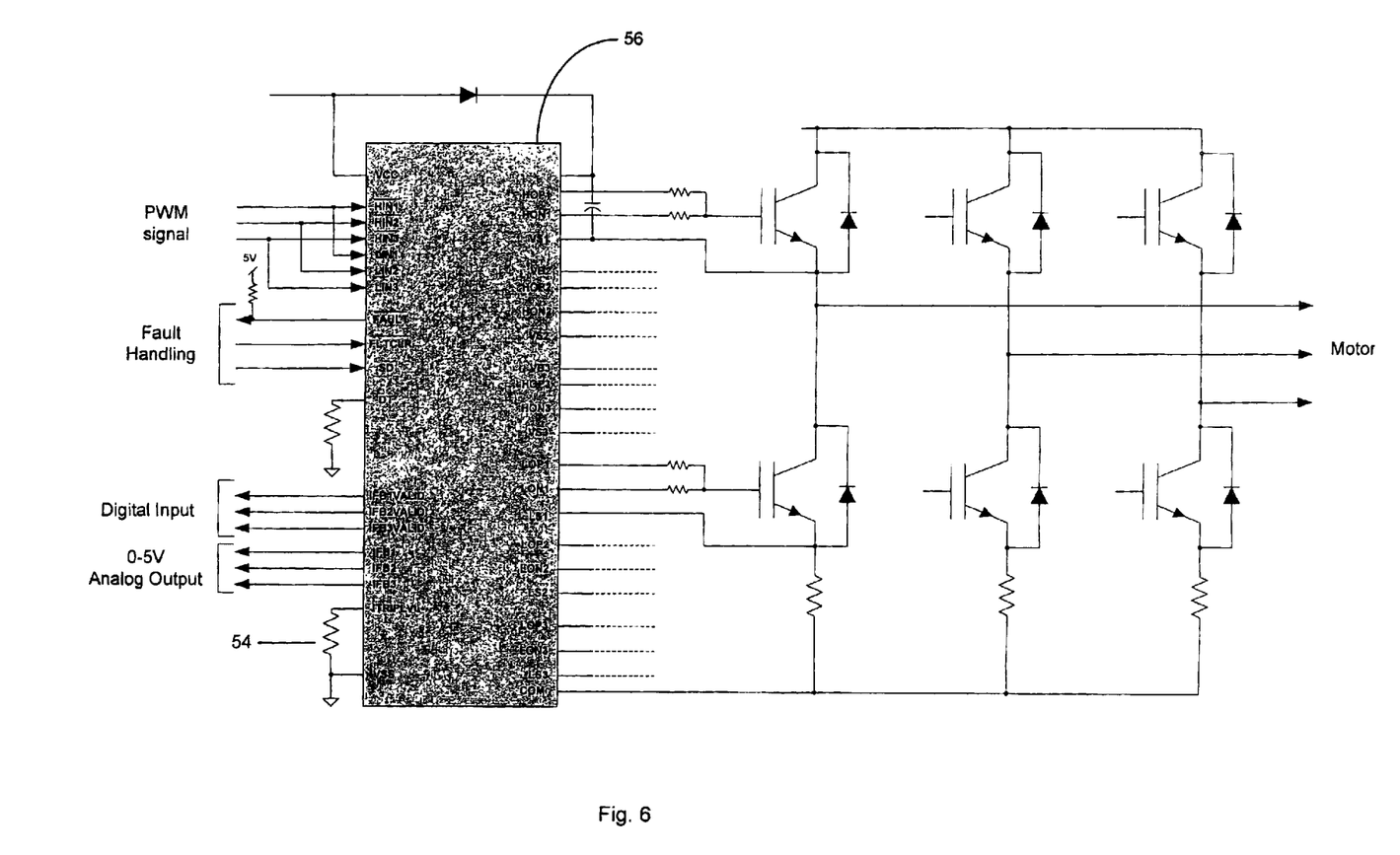
FIG. 6 shows a three phase current sensing gate driver incorporating a current sensor in accordance with the present invention as embodied in a monolithic integrated circuit.

The circuit can also accommodate overcurrent protection by providing an additional comparator comparing the sawtooth current waveform against a threshold value which can be supplied externally through a resistor 54 (FIG. 6).

If desired, in lieu of synchronizing with the gate drive signal, an external synchronization signal can be selected by applying a signal to the SEL lead and the external signal inputted through the SYNC lead.

A three phase monolithic current sensing gate driver can be constructed by tripling the circuit described in FIG. 5.

FIG. 6 shows an example of the realization in a monolithic integrated circuit 56 of a three phase gate driver combined with the motor phase current reconstruction based on the low side shunt resistor sensing.

Figure 7:
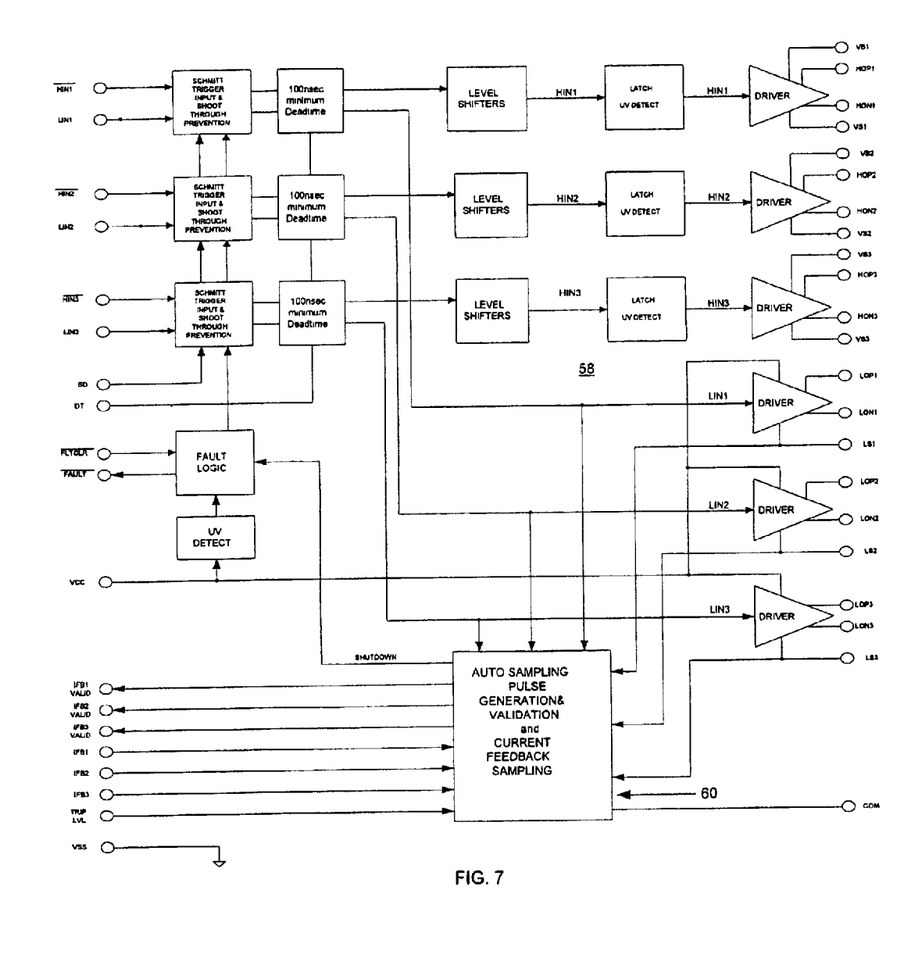
FIG. 7 shows the internal block diagram of the circuit FIG. 6.

FIG. 7 shows the internal block diagram of FIG. 6 in which the three phase gate drive circuit 58 is similar to the IR 2136 gate drive circuit available from International Rectifier and, the auto sampling pulse generation and validation and current feedback sampling unit 60 is essentially the same as the units 26 and 28 of FIGS. 3 and 4 tripled to accommodate the three phases. IFB_VALID 1, 2, 3 are validation signals for the three phases; IFB 1, 2, 3 are the current feedback signals for the three phases; TRIP LVL is the current protection signal; and VSS is the logic ground.

As should be appreciated from the foregoing, a new current sensing gate drive monolithic IC has been developed which combines the gate drive function with linear motor current sensing capability. The current sensing function does not require level shifting circuit since the circuit senses and reconstructs motor current through the low side shunt resistors. Combining the gate drive and current sensing functions and current sensing function enables both functions to be incorporated in a monolithic integrated circuit.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A circuit for generating a sinusoidal signal from a signal containing a plurality of pulses, which comprises:
   a sample and hold circuit for receiving a signal comprising a plurality of pulses; and
   means for supplying a timing signal to the sample and hold circuit such that the plurality of pulses is converted to a sinusoidal signal at the output of the sample and hold circuit;
   wherein the means for supplying the timing signal includes:
      means for generating a first ramp signal;
      a first capacitor for containing a signal proportional to a previous ramp signal;
      a comparator comparing the value of the first ramp signal to the value of the previous signal; and
      means responsive to the comparator for generating a control signal to control the sample and hold circuit.

2. A circuit in accordance with claim 1, wherein each pulse of the signal has a saw tooth wave form.

3. A circuit according to claim 2, wherein the timing is such that each pulse is sampled and held at the center of the period for each pulse.

4. A circuit for generating a sinusoidal signal from a signal containing a plurality of pulses, which comprises:
   a sample and hold circuit for receiving a signal comprising a plurality of pulses having a saw tooth wave form; and
   means for supplying a timing signal to the sample and hold circuit such that the plurality of pulses is converted to a sinusoidal signal at the output of the sample and hold circuit;
   wherein the means for supplying the timing signal includes:
      means for generating a first ramp signal;
      a first capacitor for containing a signal proportional to a previous ramp signal;
      a comparator comparing the value of the first ramp signal to the value of the previous signal; and
      means responsive to the comparator for generating a control signal to control the sample and hold circuit.

5. A circuit in accordance with claim 4, wherein the comparator allows discharge of the first capacitor when the value of the first ramp signal is greater than the previous ramp signal and wherein the comparator outputs the control signal when the value of the voltage of the capacitor matches the value of the first ramp signal.

6. A circuit in accordance with claim 5, wherein the sample and hold circuit includes a second capacitor, the control signal from the comparator having an on period and an off period and the capacitor being charged during the on period and the charge being held during the off period.

7. A circuit for driving a load and sensing load current, comprising:
   at least one power transistor connected to the load;
   a gate drive unit for applying a gate drive signal to a gate of the transistor to turn the transistor on and off;
   a current sensing device connected to the load for generating a signal proportional to current in the load, the signal being comprised of a plurality of pulses; and
   a sample and hold circuit for sampling and holding each of the pulses at predetermined times, the timing of the sample and hold circuit being controlled by the gate drive unit.

8. A circuit in accordance with claim 7, wherein each pulse of the signal has a saw tooth wave form.

9. A circuit in accordance with claim 8, wherein the gate drive unit controls the timing of the sample and hold circuit such that the pulses of the signal are sampled and held at the center of the off period of the gate signal.

10. A circuit in accordance with claim 9, wherein the load is a motor.

11. A circuit for driving a three phase AC motor load and sensing motor current, comprising:
   a plurality of power transistors connected to the respective phases of the motor;
   a gate drive unit for applying gate drive signals to the gates of the transistors to selectively turn the transistors on and off;
   a current sensing device for each phase connected to the motor for generating a signal proportional to current in that phase, the signal being comprised of a plurality of pulses; and
   a sample and hold circuit for each phase for sampling and holding each of the pulses generated by the current sensing device for that phase at predetermined times, the timing of the sample and hold circuit being controlled by the gate drive unit.

12. A circuit in accordance with claim 11, wherein each pulse of the signal has a saw tooth wave form.

13. A circuit in accordance with claim 12, wherein the gate drive unit includes a sample pulse generator for generating timing pulses for controlling the sample and hold circuit.

14. A circuit for driving a three phase AC motor load and sensing motor current, comprising:
    a plurality of power transistors connected to the respective phases of the motor;
    a gate drive unit for applying gate drive signals to the gates of the transistors to selectively turn the transistors on and off;
    a current sensing device for each phase connected to the motor for generating a signal proportional to current in that phase, the signal being comprised of a plurality of pulses; and
    a sample and hold circuit for each phase for sampling and holding each of the pulses generated by the current sensing device for that phase at predetermined times, the timing of the sample and hold circuit being controlled by the gate drive unit wherein the sample pulse generator includes:
    means responsive to the gate drive signal for generating a first ramp signal;
    a first capacitor for containing a signal proportional to a previous ramp signal;
    a comparator for comparing the value of the first ramp signal to the value of the previous signal; and
    means responsive to the comparator for generating a control signal to control the sample and hold circuit.

15. A circuit in accordance with claim 14, wherein the comparator allows discharge of the first capacitor when the value of the first ramp signal is greater than the value of the previous ramp signal and wherein the comparator outputs the control signal when the value of the voltage of the capacitor matches the value of the first ramp signal.

16. A circuit in accordance with claim 15, wherein the sample and hold circuit includes a second capacitor, the control signal from the comparator having an on period and an off period and the capacitor being charged during the on period and the charge being held during the off period.

* * * * *